US009841015B2

(12) United States Patent
Wichmann

(10) Patent No.: US 9,841,015 B2
(45) Date of Patent: Dec. 12, 2017

(54) ARRANGEMENT AND METHOD FOR MEASURING A DELIVERY VOLUME AND A DELIVERY RATE OF AN INTERMITTENTLY OPERATING PUMP

(71) Applicant: BASF SE, Ludwigshafen (DE)

(72) Inventor: Wolf-Dieter Wichmann, Neetzow (DE)

(73) Assignee: BASF SE, Ludwigshafen (DE)

( * ) Notice: Subject to any disclaimer, the term of this patent is extended or adjusted under 35 U.S.C. 154(b) by 183 days.

(21) Appl. No.: 14/894,755

(22) PCT Filed: Jun. 3, 2014

(86) PCT No.: PCT/EP2014/061469
§ 371 (c)(1),
(2) Date: Nov. 30, 2015

(87) PCT Pub. No.: WO2014/195305
PCT Pub. Date: Dec. 11, 2014

(65) Prior Publication Data
US 2016/0108906 A1 Apr. 21, 2016

(30) Foreign Application Priority Data
Jun. 5, 2013 (EP) .................................... 13170608

(51) Int. Cl.
F04C 29/12 (2006.01)
F04B 51/00 (2006.01)
(Continued)

(52) U.S. Cl.
CPC .............. F04B 51/00 (2013.01); F04B 13/00 (2013.01); F04B 19/22 (2013.01); F04B 23/02 (2013.01);
(Continued)

(58) Field of Classification Search
CPC ...................................................... F04B 51/00
See application file for complete search history.

(56) References Cited

U.S. PATENT DOCUMENTS

2003/0223882 A1 12/2003 Greene, Jr.
2005/0279772 A1 12/2005 Speight
(Continued)

FOREIGN PATENT DOCUMENTS

DE 44 17 213 11/1995

OTHER PUBLICATIONS

International Search Report dated Nov. 13, 2014, prepared in International Application No. PCT/EP2014/061469.
(Continued)

Primary Examiner — Clayton E Laballe
Assistant Examiner — Dennis Hancock
(74) Attorney, Agent, or Firm — Brinks Gilson & Lione

(57) ABSTRACT

The present invention relates to an arrangement for detecting a delivery volume and/or a delivery flow, with a discontinuously operating pump (1), at least one outlet line (3) and/or one inlet line (2, 2-1, 2-2) and a passive valve (5, 5-1, 5-2), which is arranged in the outlet line (3) or the inlet line (2, 2-1, 2-2) and which has a valve seat (15-1, 15-2) and a valve head (16-1, 16-2), the valve (5, 5-1, 5-2) being closed in a first position of the valve head (16-1, 16-2) and being open in a second position of the valve head (16-1, 16-2) of the valve (5, 5-1, 5-2). The arrangement according to the invention is defined by a sensor (8, 8-1, 8-2), by means of which values can be detected which indicate whether the valve head (16-1, 16-2) is in the first or the second position, and by a computing unit (9) which is coupled to the sensor (8, 8-1, 8-2) and by means of which the volume delivered by the pump (1) and/or the delivery flow of the pump (1) can be calculated on the basis of the detected values of the sensor (Continued)

Figure 1:
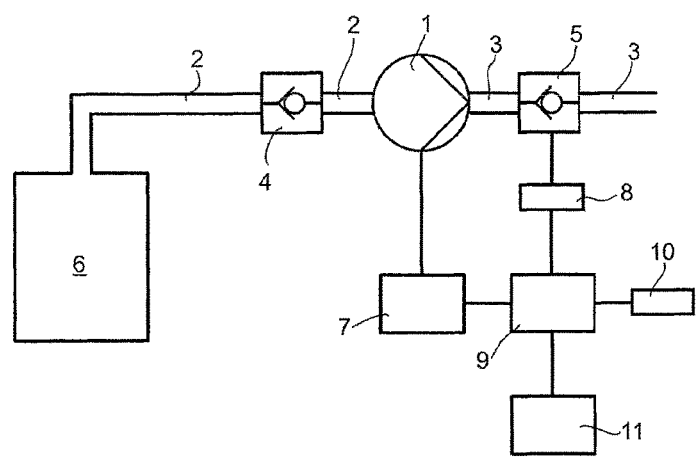

(8, 8-1, 8-2). The invention relates furthermore, to an extraction system for a plant protective with such an arrangement and to a method for detecting a delivery volume and/or a delivery flow of a discontinuously operating pump, which method can be carried out by this arrangement.

15 Claims, 3 Drawing Sheets

(51) Int. Cl.
| | |
|---|---|
| *F04B 13/00* | (2006.01) |
| *F04B 49/06* | (2006.01) |
| *F04B 49/22* | (2006.01) |
| *G01F 1/26* | (2006.01) |
| *G01F 15/00* | (2006.01) |
| *F04B 19/22* | (2006.01) |
| *F04B 23/02* | (2006.01) |
| *F04B 43/02* | (2006.01) |
| *F04B 53/10* | (2006.01) |
| *F04C 14/24* | (2006.01) |

(52) U.S. Cl.
CPC ............ *F04B 43/02* (2013.01); *F04B 49/065* (2013.01); *F04B 49/225* (2013.01); *F04B 53/10* (2013.01); *G01F 1/26* (2013.01); *G01F 15/005* (2013.01); *F04B 2205/09* (2013.01); *F04C 14/24* (2013.01); *F04C 2270/205* (2013.01); *F04C 2270/585* (2013.01)

(56) References Cited

U.S. PATENT DOCUMENTS

2007/0228071 A1\* 10/2007 Kamen ................ G05D 7/0647
222/52
2012/0128533 A1    5/2012 Deguchi et al.

OTHER PUBLICATIONS

International Preliminary Report on Patentability and translation dated Oct. 30, 2015, prepared in International Application No. PCT/EP2014/061469.

\* cited by examiner

ARRANGEMENT AND METHOD FOR MEASURING A DELIVERY VOLUME AND A DELIVERY RATE OF AN INTERMITTENTLY OPERATING PUMP

This application is a National Stage application of International Application No. PCT/EP2014/061469, filed Jun. 3, 2014. This application also claims priority under 35 U.S.C. §119 to European Patent Application No. 13170608.7 filed Jun. 5, 2013.

The present invention relates to an arrangement for detecting a delivery volume and/or a delivery flow. The arrangement comprises a discontinuously operating pump, at least one outlet line and/or one inlet line and a passive valve. The valve is arranged in the outlet line or the inlet line. It has a valve seat and a valve head, the valve being closed in a first position of the valve head and the valve being open in a second position of the valve head. The invention relates furthermore, to an extraction system for a plant protective, having such an arrangement, and to a method for detecting a delivery volume and/or a delivery flow of a discontinuously operating pump. The invention relates moreover to a method for metering a plant protective.

In many sectors of industry and, for example, also agriculture, many different types of discontinuously operating pumps, such as, for example piston pumps, are used for various tasks. In some applications, the exact delivery volume of the piston pump is not of fundamental importance for its use. However, when a piston pump is used as a metering pump, the precise detection of the delivery volume or delivery flow is of major importance. Particularly when a discontinuously operating pump is employed in an extraction system for a plant protective, it is very important to detect what plant protective volume has been discharged.

There are many different measuring instruments and sensors for measuring volumetric flow of liquids. These measuring instruments and sensors can detect accurately the delivery volume and the delivery flow of continuously operating pumps, such as, for example, centrifugal, vane-cell, or positive displacement pumps. However, a discontinuously operating pump generates a highly fluctuating pulsating delivery flow. Such a delivery flow cannot be measured accurately by known measuring instruments and sensors. It is therefore known to damp and to smooth the pulsation of a delivery flow which is generated by a discontinuously operating pump. For example, air or pressure chambers, as they are known, are employed. After such damping and smoothing of the delivery flow, for example, the delivery flow of a piston pump can also be measured relatively accurately by means of a flowmeter.

Where a discontinuously operating pump is concerned, however, if the use of damping or smoothing methods for the delivery flow is not technically possible, or only to a restricted extent, conventional flowmeters cannot be employed in order to detect the delivery volume or delivery flow accurately.

The object on which the present invention is based, therefore, is to provide an arrangement, an extraction system and a method of the type initially mentioned, by means of which the delivery volume and/or the delivery flow of a discontinuously operating pump can be detected with high accuracy.

This object is achieved, according to the invention, by means of an arrangement having the features of claim 1, an extraction system having the features of claim 10, and a method having the features of claim 14 and a method having the features of claim 19. Advantageous refinements and developments will be gathered from the dependent claims.

The arrangement according to the invention for detecting a delivery volume and/or a delivery flow comprises a discontinuously operating pump, at least one outlet line and/or one inlet line and a passive valve arranged in the outlet line or inlet line. The valve has a valve seat and a valve head, the valve being closed in a first position of the valve head and being open in a second position of the valve head. Furthermore, the arrangement according to the invention comprises a sensor, by means of which values can be detected which indicate whether the valve head is in the first or the second position. Finally, the arrangement according to the invention comprises a computing unit which is coupled to the sensor and by means of which the volume delivered by the pump and/or the delivery flow of the pump can be calculated on the basis of the detected values of the sensor.

A discontinuously operating pump is understood in the context of the invention to mean a pump in which the size of the delivery flow varies, in particular varies sharply, as a consequence of the type of construction. Such a pump operates in a pulse-like manner. A pulsating delivery flow is generated. One example of such a discontinuously operating pump is a piston pump.

A passive valve is understood in the context of the invention to mean a valve which opens due to the fact that an opening force is overshot on one side of the valve. The passive valve thus opens automatically due to the pressure which the fluid, which flows through the valve in the open state of the valve, exerts upon the valve head.

The opposite of a passive valve is an actively controlled valve which, for example, is opened manually or by means of an electrical pulse. In the case of an active valve, the opening and closing of the valve takes place, in particular, independently of the pressure of the fluid which flows through the valve in the open state.

In the closed state of the valve, the valve head of the passive valve bears against the valve seat and thereby seals off the valve. The valve head may have various geometries. For example, the valve head may be designed as a valve ball or valve cone.

The valve has, in particular, a valve spring which presses the valve head with an opening force into the first position. The valve is, in particular, a nonreturn valve.

The valve is arranged, in particular, in the outlet line. If the arrangement comprises a plurality of outlet lines, a passive valve is arranged, in particular, in each outlet line. The position of the valve heads of all the valves is then detected by one or more sensors.

The pump comprises, in particular, a driven pump element, by means of which the fluid to be delivered is pressed into the outlet line or outlet lines, so that the delivered fluid moves the valve head or valve heads into the second position counter to an opening force of the valve.

In the arrangement according to the invention, the delivery volume or the delivery flow of the discontinuously operating pump can be determined with high accuracy, since there is no continuous measurement of the throughflow rate, but instead the state of the valve in the outlet line or inlet line is detected. The highly pulsating delivery flow influences the position of the valve head insofar as it brings the valve head into the positions in which the valve is closed or open. These positions of the valve head are in direct relation to the delivery volume or delivery flow. The detected values of the position of the valve head can therefore be used by the computing unit for the accurate calculation of the delivered fluid volume or of the delivery flow of the pump.

According to one refinement of the arrangement according to the invention, the pump operates cyclically. In each cycle, a defined fluid volume is delivered by the pump. In this case, between two cycles, the valve head is in the first position in which the valve is closed. By means of the computing unit and the sensor, it can be detected how frequently the valve head changes from the first position to the second. The volume delivered by the pump can then be calculated on the basis of the number of changes from first position to the second.

Such a cyclically operating pump is, in particular, a piston pump. Furthermore, the pump may be a diaphragm pump. Where a piston pump is concerned, a defined volume predetectable by calibration is delivered per piston stroke, that is to say during each cycle. The delivery volume can then be calculated by the computing unit from the number of cycles multiplied by the volume per piston stroke. The number of cycles is obtained for the computing unit from the detected values of the sensor. From the development in time of the delivered volume, the computing unit can then also calculate the delivery flow.

Thus, according to the invention, the stroke of the cyclically operating pump is detected by means of the valves which are arranged in any case in the pump.

According to this refinement of the arrangement according to the invention, the delivery volume of, in particular, a piston pump, can be detected at low outlay in technical terms and therefore very cost-effectively. Furthermore, the delivery volume is detected with high accuracy. In piston pumps, because of high pressures exerted upon the fluid to be delivered, uncontrollable backflows may occur in the outlet line or inlet line. Where a flowmeter is concerned, such backflows lead to inaccuracies in the measurement of the delivery flow and, correspondingly, in the calculation of the delivery volume. Measurement inaccuracies of this kind are avoided in the arrangement according to the invention, since the delivery volume can be determined simply from a count in conjunction with calibration previously carried out.

All the factors influencing the stroke volume per cycle of the pump can be taken into account in the calibration. The average delivery volume per piston stroke is detected during calibration, in that the delivery rate of a very large number of pump strokes is collected and measured. The average delivery volume per piston stroke can then be determined with high accuracy from the number of cycles, that is to say the number of delivery strokes, of the pump. The stroke volume can be obtained during calibration particularly for the fluid to be delivered. Adverse influences of the positively and negatively accelerated liquid column during the delivery of the fluid are therefore also taken into account automatically.

The count of the cycles of the pump which is to be carried out later when the pump is in operation, is not subject to any measurement inaccuracies. The volume delivered by the pump can thus be detected with the accuracy of the previous calibration. The delivery volume and delivery flow of a cyclically operating pump, in particular of a piston pump, can thus be detected with high accuracy.

Since, in the simplest case, the sensor only has to detect the two positions of the valve head, the sensor may be a simple switch which is opened or closed in the event of a change in position of the valve head. Only the frequency of the switch change then has to be counted in the computing unit. The computing unit can calculate the delivery volume from this. The arrangement according to the invention can thus be implemented very simply and cost-effectively.

According to a development of the arrangement according to the invention, the pump is driven hydraulically. In the case of a discontinuously operating pump driven hydraulically, the problem arises that delivered fluid is accelerated very sharply and is then likewise braked again sharply. Such sharp positive and negative accelerations occur particularly in hydraulically driven piston pumps. These relatively quick-alternating successive phases of positive and negative acceleration of the delivered fluid column make it technically very complicated and difficult to detect and measure the delivery volume or delivery flow accurately by means of known throughflow rate measurement methods. To be precise, due to the inertia of the positively and negatively accelerated fluid column delivered, unwanted and indefinable backflows of the fluid column occur. These backflows are caused by gas particles present to a greater or lesser extent in the fluid and also, optionally, by elastic sealing elements of the pump. The gas particles and/or elastic sealing elements are compressed during the positive acceleration of the fluid column and are decompressed again during the negative acceleration of the latter. Decompression is the cause of these uncontrollable backflows.

By means of the arrangement according to the invention, it is possible to detect accurately highly pulsating delivery flows of piston pumps even when these metering piston pumps are directly driven hydraulically.

According to a development of the arrangement according to the invention, the latter comprises a test device which is coupled to the pump and the sensor. By way of the test device, it is possible to test whether the valve head has changed from the first position to the second position within a defined time interval after the end of the cycle. By way of the test device it is advantageously possible to check whether the pump is malfunctioning or the container from which the fluid is delivered is in an empty state. To be precise, if the valve head has not changed from the first position to the second position in a cycle or immediately thereafter, it is possible for air rather than the fluid to be sucked in. In this case, the air pressure generated by the compression is not sufficient to open the valve. The pump then compresses and decompresses only the air, without the valve opening.

In a development of the arrangement according to the invention, in the second position of the valve head the position of the valve head in relation to the valve seat can be detected by means of the sensor. The sensor thus detects how far the valve is open. It is thereby possible to determine the size of the delivery flow even more accurately and, in particular, with even higher time resolution.

In this case, the sensor is, in particular, a distance sensor, by means of which the distance of the valve head from a reference point can be detected. The reference point is in this case at a fixed location, but at least in a constant geometric position with respect to the valve seat. The position of the valve head in relation to the valve seat can thus be determined from the distance of the valve head from a reference point. Distance sensors of this type are highly cost-effective, so the arrangement according to the invention can in this way be produced highly cost-effectively. Furthermore, by means of a distance sensor, the distance of the valve head from the reference point can be detected with high accuracy. Since this distance has an unequivocal relationship to the throughflow cross section of the open valve in the second position of the valve head, the computing unit can thereby calculate the delivery flow very accurately.

According to another refinement of the arrangement according to the invention, the sensor is a motion sensor by way of which a movement of the valve head is detectable. A change in position of the valve head can thus be detected very reliably and easily.

In this development, the computing unit is coupled, in particular to a memory which stores calibration data which indicate the delivery flow through the valve as a function of the position of the valve head in relation to the valve seat. In this case, by means of the computing unit, the fluid volume delivered by the pump and/or the delivery flow of the pump can be calculated on the basis of the position, detected continuously by the sensor, of the valve head and on the basis of the calibration data. In this case, the delivery volume and delivery flow can be detected continuously with high accuracy, specifically even when the pump operates discontinuously, but not cyclically. Furthermore, where cyclically operating pumps are concerned, the delivery flow can also be detected accurately within a cycle.

The computing unit can comprise a (further) memory for storing an initial volume. By way of the computing unit, the delivered volume and/or a remaining volume can then be calculated and can be output by an indicator device. Preferably, in this case, by means of the computing unit, an indication of an empty state is indicated by the indicator device when the remaining volume is below a defined limit value.

The invention relates, furthermore, to an extraction system for a plant protective. The extraction system comprises a container, which has a container wall and an extraction orifice, the container wall surrounding an inner space for receiving the plant protective. The extraction system comprises, furthermore, the above-described arrangement for detecting a delivery volume and/or delivery flow, the discontinuously operating pump being coupled to the container, such that plant protective located in the container is delivered by means of the inlet line of the pump through the pump to the outlet line of the pump. Moreover, the sensors and the computing unit are arranged in an external unit. The container has a first connection for coupling the sensor to the valve of the pump for the purpose of detecting the position of the valve head.

The discontinuously operating pump can for example be arranged in the inner space of the container, such that plant protective located in the container is delivered by means of the inlet line of the pump through the pump via the outlet line of the pump to the extraction orifice of the container.

According to another refinement, the discontinuously operating pump is fastened to the outside of the container. The container wall can form for example a cutout into which the pump is inserted from the outside.

The extraction system according to the invention is thus divided into two separate components: the first component comprises the container with the pump and with the valve. The second component comprises the sensor and the computing unit. The two components can be coupled to one another via the first connection of the container, so that the volume delivered by the pump, which is located inside the container, can be determined accurately from outside. It can thereby be indicated to the user how much plant protective has been discharged or, if it is known, how much plant protective was originally in the container, the remaining quantity of plant protective can be indicated.

According to a development of the extraction system, the external unit has, furthermore, a control device. The container then has a second connection for coupling the control device to the pump for the purpose of controlling the pump. The control device can be coupled, furthermore, to the computing unit, so that the delivery of the plant protective from the extraction system can be monitored and controlled by means of the external unit.

According to a further exemplary embodiment of the extraction system according to the invention, the latter comprises a plurality of containers which each comprise a pump. In this case, the extraction system can additionally have a changing device by means of which the coupling of the sensor with the first connection and optionally the coupling of the control device or a drive unit with the second connection can be released from the first container and coupled with corresponding connections of a further container. Alternatively, the sensor and the control device or the drive unit are already coupled with the respective connections of all the containers of the extraction system. The changing device can then execute a switchover between the containers.

The invention relates, furthermore, to a method for detecting a delivery volume and/or a delivery flow of a discontinuously operating pump. In the method, a pump element is driven, with the result that a fluid is delivered, the delivered fluid opening a passive valve, arranged in an outlet line and/or an inlet line, counter to an opening force of the valve, in that a valve head is moved in relation to a valve seat, from a first position into a second position. In the method according to the invention, the position of the valve head is detected and the volume delivered by the pump and/or the delivery flow of the pump are/is calculated from this.

The method according to the invention can be carried out, in particular, by the arrangement according to the invention. It therefore has the same advantages as the arrangement according to the invention.

According to one refinement of the method according to the invention, the pump operates cyclically, a defined fluid volume being delivered by the pump during each cycle. Between two cycles, the valve head is in the first position in which the valve is closed. In the method, it is detected how frequently the valve head changes from the first position to the second. The volume delivered by the pump is calculated on the basis of the number of changes from the first position to the second position. Thus, in particular, the delivery volume of a piston pump can be detected with high accuracy. A change from the first to the second position can be detected for example by means of a motion sensor.

According to one refinement of the method according to the invention, it is tested whether the valve head has changed from the first position to the second position within a defined time interval after the end of a cycle. If the valve head has not changed from the first position to the second position within the time interval after the end of a cycle, a delivery malfunction is detected. This delivery malfunction can have been caused in particular by an empty state of a container from which the fluid is delivered. This can thus be detected by the method according to the invention.

According to a further refinement of the method according to the invention, in the second position of the valve head the position of the valve head in relation to the valve seat is detected. In this case, in particular, the volume delivered by the pump and/or the delivery flow of the pump can be calculated on the basis of calibration data, which indicate the delivery flow through the valve as a function the position of the valve head in relation to the valve seat, and on the basis of the continuously detected position of the valve head.

The invention relates, furthermore, to a method for metering a plant protective, in which the plant protective is delivered by means of a discontinuously operating pump and the delivery volume and/or the delivery flow are/is detected by means of the method described above.

In this method, the plant protective is delivered from a container in particular by means of the pump. The initial volume of the plant protective in the container is detected and the delivered volume of the plant protective and/or the remaining volume of the plant protective in the container are calculated and stored.

According to one refinement of the method, an indication of an empty state of the container is output when the remaining volume is below a defined limit value and a delivery malfunction has been detected because, for example, the container is in an empty state. Furthermore, an indication of a malfunction can be output when the remaining volume is not below the defined limit value and yet a delivery malfunction has been detected.

If an empty state of the container has been detected, the pump can be switched off and it is possible to switch over to another, full container. This other container can in this case be comprised by the extraction system. Subsequently, the plant protective is delivered from the other container.

It is an advantage of this method that the plant protective can be extracted substantially without interruption, even if the extracted quantity is greater than the quantity which can be received by a container. Following completion of extraction, the empty container can be replaced. The other container, which optionally still contains a remaining quantity, can remain in the extraction system.

The invention, then, is explained by means of exemplary embodiments with reference to the drawings.

Figure 2:
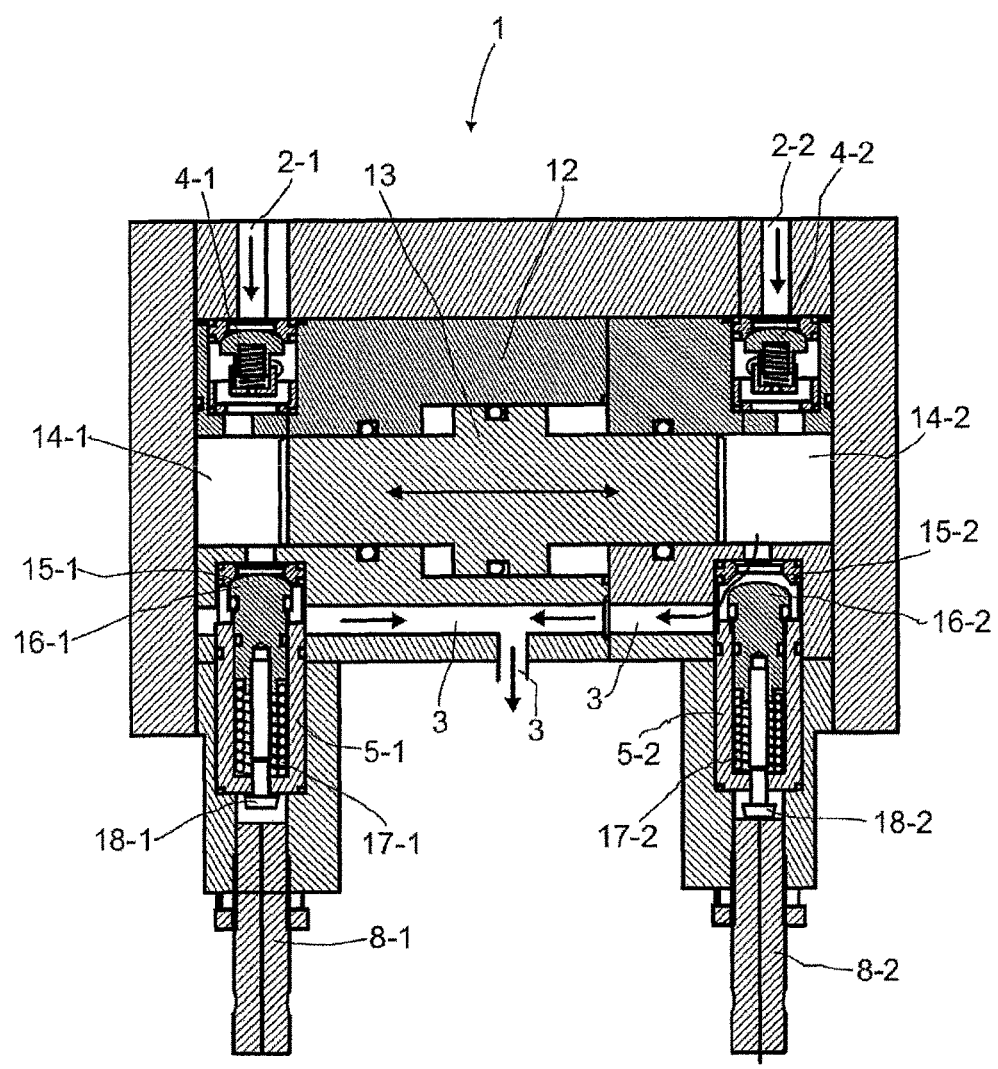
Figure 3:
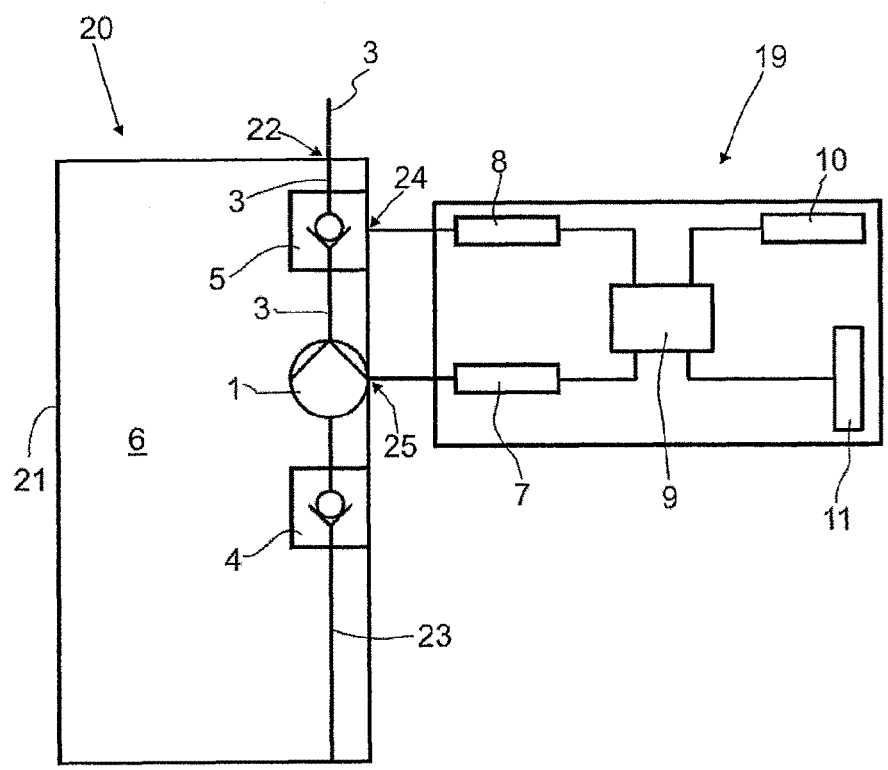

FIG. 1 shows the basic setup of an exemplary embodiment of the arrangement according to the invention, FIG. 2 shows in the form of a detail, a view of the pump and sensor of exemplary embodiments of the arrangement according to the invention, and FIG. 3 shows an exemplary embodiment of the extraction system according to the invention which uses an exemplary embodiment of the arrangement according to the invention.

The arrangement has a discontinuously operating pump 1. In an exemplary embodiment of the arrangement according to the invention, this pump 1 is designed as a piston pump. An inlet line 2 or intake line is arranged on the intake side of the pump 1 and an outlet line 3 is arranged on the delivery side of the pump 1. When the pump 1 is in operation, the fluid to be delivered is sucked in from the inlet line 2 and is delivered into the outlet line 3 by the pump 1.

A passive valve 4, which is designed as a nonreturn valve, is arranged in the inlet line 2. The pump 1 generates an intake pressure, by means of which the valve 4 is opened. A valve 5, which is also designed as a nonreturn valve, is likewise arranged in the outlet line 3. The pump 1, when in operation, generates in the outlet line the fluid pressure which opens the valve 5. The inlet line 2 is connected to a container 6 for receiving the fluid to be delivered. The outlet line 3 issues into a metering line. Such an extraction system is known per se.

Thus, when the pump 1 is in operation, fluid is sucked in from the container 6 and is delivered through the inlet line and the pump 1 into the outlet line 3.

To detect the delivery volume and delivery flow, the arrangement has a sensor 8, by means of which it can be detected whether the valve 5 is in a closed or open state. The coupling of the sensor 8 to the valve 5 is explained in detail later.

The sensor 8 is coupled to a computing unit 9. The sensor 8 continuously transmits values relating to the state of the valve 5 to the computing unit 9 on the basis of data. The computing unit 9, by means of the values detected by the sensor 8, calculates the volume delivered by the pump 1 and optionally the delivery flow which is generated by the pump 1. For this calculation, the computing unit 9 has access to data that are stored by a memory 10. How the computing unit 9 calculates the delivery volume or delivery flow is explained in detail later.

Furthermore, the initial volume of a fluid is stored in the memory 10 or a further memory, such that the delivered volume and/or a remaining volume can be calculated by the computing unit 9.

Furthermore, the computing unit 9 is connected to an indicator device 11, by means of which the volume delivered from the container 6, the instantaneous delivery flow, the remaining quantity of fluid located in the container 6, an indication of an empty state and/or a delivery malfunction can be indicated.

Moreover, a control device 7 is provided, which is coupled to the computing unit 9 and the pump 1. The computing unit 9 transmits to the control device 7 the volume delivered from an initial time point and also the delivery flow of the pump 1. The control device 7 controls the drive of the pump 1, optionally taking into account the data transmitted by the computing unit 9.

Furthermore, a test device is integrated into the control device 7. This test device is coupled to the pump 1 and the sensor 8. By way of the test device, it can be tested whether for example the pump 1 is malfunctioning or no more fluid is being delivered, as will be explained later, because for example the container from which the fluid is delivered is in an empty state.

Referring to FIG. 2, the exemplary embodiment of the arrangement is explained further in detail below:

The pump 1 is in this case designed as a reciprocating piston pump. It comprises a housing 12, which receives a reciprocating piston 13 such that a first delivery chamber 14-1 and a second delivery chamber 14-2 are formed in a cylindrical cavity. The reciprocating piston 13 may be driven in any desired way, for example, by an electric, pneumatic or hydraulic drive. During operation, the reciprocating piston 13 is moved to and fro between a first position, in which it is on the left side in the illustration according to FIG. 2, and a second position, in which it is on the right side in the illustration according to FIG. 2. During movement from the first position to the second, in this case the volume of the first delivery chamber 14-1 is increased and the volume of the second delivery chamber 14-2 simultaneously reduced. Conversely, during the movement of the reciprocating piston 13 from the second position to the first position, the volume of the first delivery chamber 14-1 is reduced and the volume of the second delivery chamber 14-2 is increased.

Thus, when the pump is in operation, during the driven movement of the reciprocating piston 13 from the first position to the second position fluid is sucked into the first delivery chamber 14-1 through a first inlet line 2-1 and through a first inlet valve 4-1, which is opened as a result of the intake pressure. The first outlet valve 5-1 assigned to the first delivery chamber 14-1 is in this case closed. At the same time, the fluid located in the second delivery chamber 14-2 is pressed into the outlet line 3, with the result that the second outlet valve 5-2 is opened. A second inlet valve 4-2 in a second inlet line 2-2, which issues into the second delivery chamber 14-2, is in this case closed. When the reciprocating piston 13 moves in the other direction, fluid is sucked into the second delivery chamber 14-2 via the second inlet line 2-2 and is conveyed out of the first delivery chamber 14-1 via the open first outlet valve 5-1 into the outlet line 3. A highly pulsating delivery flow is thus generated in the outlet line 3 by the pump 1.

Both outlet valves 5-1, 5-2 are designed as nonreturn valves which have a valve seat 15-1, 15-2 and a valve head 16-1, 16-2. Furthermore, the two outlet valves 5-1, 5-2 have in each case a valve spring 17-1, 17-2. This spring 17-1, 17-2 exerts upon the respective valve head 16-1, 16-2, a force which presses the valve head 16-1, 16-2 onto the respective valve seat 15-1, 15-2. In this state, the valve 5-1, 5-2 is closed and the valve head 16-1, 16-2 is in the first position. If, then pressure is exerted upon the valve head 16-1, 16-2 by the fluid to be delivered and this pressure exceeds the opening pressure of the respective valve 5-1, 5-2, the valve 5-1, 5-2 opens automatically, the valve head 16-1, 16-2 being moved away from the valve seat 15-1, 15-2. When the valve 5-1, 5-2 is open, the valve head 16-1, 16-2 is in a second position.

The sensors 8-1, 8-2 are provided in each case for the two outlet valves 5-1, 5-2. The function of the sensors 8-1, 8-2 and of the sensors 8 of FIG. 1 is explained below with reference to the sensor 8-1 for the outlet valve 5-1:

The outlet valve 5-1 comprises a setscrew 18-1, which is first adjusted and then locked. The head of the setscrew 18-1 moves together with the valve head 16-1.

In an exemplary embodiment, the sensor 8-1 is designed as a switch. When the valve head 16-1 is in the first position, in which the outlet valve 5-1 is closed, the sensor 8-1 is spaced apart from the setscrew 18-1. When the valve head 16-1 is in the second position, in which the outlet valve 5-1 is open, the head of the setscrew 18-1 contacts the sensor 8-1, as shown in FIG. 2 at the corresponding sensor 8-2. This contacting of the setscrew 18-1 is detected by the sensor 8-1 and is transmitted to the computing unit 9 in a way known per se. When the valve head 16-1 is moved into the first position again, the contacting of the setscrew 18-1 is cancelled. This, too, is detected by the sensor 8-1 and is transmitted to the computing unit 9 in a way known per se. The sensor 8-2 transmits correspondingly the position of the valve head 16-2 and correspondingly the state of the outlet valve 5-2 to the computing unit 9.

The sensors 8-1, 8-2 are thus designed as simple switches. Alternatively, the position of the setscrews 18-1, 18-2 and therefore of the valve heads 16-1, 16-2 could also be detected capacitively.

In the simplest embodiment, the computing unit 9 counts how frequently the valve head 16-1 and the valve head 16-2 have been moved from the first position to the second position. During each opening of the outlet valve 15-1, the maximum volume of the first delivery chamber 14-1 has been delivered into the outlet line 3. The maximum volume of the first delivery chamber 14-1 is the volume of the delivery chamber 14-1, when the reciprocating piston 13 is in the second position, that is to say at the reversal point on the right side in the illustration according to FIG. 2. The value of this maximum volume is stored in the memory 10. The delivery volume which has been delivered via the first delivery chamber 14-1 is thus obtained for the computing unit 9 from the number of changes of the valve head 16-1 from the first position to the second position, multiplied by the maximum volume of the first delivery chamber 14-1. Correspondingly, the value of the maximum volume of the second delivery chamber 14-2 is stored in the memory 10. The volume delivered via the second delivery chamber 14-2 is thus obtained from the number of changes of the valve head 16-2 from the first position to the second position, multiplied by the maximum volume of the second delivery chamber 14-2. When the computing unit 9 adds the volume delivered via the first delivery chamber 14-1 and the volume delivered via the second delivery chamber 14-2, the delivery volume of the entire arrangement is obtained. If the time interval in which this delivery volume has been delivered is taken into account, the corresponding delivery flow can be calculated.

The maximum volume of the delivery chamber 14-1 or 14-2 corresponds to the delivery volume per piston stroke for the respective delivery chamber 14-1, 14-2. This delivery volume per piston stroke is determined by calibration before the arrangement is put into operation. For this purpose, by means of the pump 1, the fluid with which the arrangement is to be operated later is delivered. At the same time it is detected how frequently the reciprocating piston moves to and fro and how frequently the valve heads 16-1, 16-2 are correspondingly moved from the first position to the second position. The fluid delivered into the outlet line 3 in this way is collected separately for the two delivery chambers 14-1, 14-2 and the volume is determined exactly. The delivery volume per piston stroke or the respective maximum volume can then be calculated for the two delivery chambers 14-1, 14-2, from the volume and the number of changes in state of the valve heads 16-1, 16-2. These calibration data are stored in the memory 10.

In another exemplary embodiment, the sensor 8 and respectively the sensors 8-1 and 8-2 are not designed as simple switches but rather as motion sensors. The motion sensors 8-1 and 8-2 then detect a movement of the valve head 16-1 and 16-2, respectively. The motion sensors 8-1 and 8-1 output for example a signal a movement of the valve head 16-1 and 16-2, respectively, has been detected after these were previously at rest.

In another exemplary embodiment, the sensor 8 and respectively the sensors 8-1 and 8-2 are not designed as simple switches, but instead as distance sensors. The distance sensors 8-1 and 8-2 detect the distance of the end face of the setscrew 18-1 and 18-2 from a fixed reference point in the distance sensor 18-1 and 18-2. The first position of the valve head 16-1 and 16-2 is assigned a defined distance value which is stored in the memory 10. When this distance value is transmitted to the computing unit 9 by the sensor 8-1 or 8-2, the computing unit 9 recognizes that the respective valve 5-1 or 5-2 is in a closed state. If, then, for example, the outlet valve 5-1 is opened when fluid is delivered out of the first delivery chamber 14-1 and the valve head 16-1 is moved toward the sensor 8-1, the distance of the reference point of the distance sensor 8-1 from the end face of the setscrew 18-1 decreases. Such a decrease in the distance is transmitted by the sensor 8-1 to the computing unit 9 which detects this variation in distance as a change from the first position of the valve head 16-1 to the second position of the valve head 16-1.

However, via the distance of the end face of the setscrew 18-1 from the reference point of the distance sensor 8-1, the computing unit 9 also continuously detects the position of the valve head 16-1 in relation to the valve seat 15-1. The opening stroke of the outlet valve 5-1 is thus detected. This opening stroke of the outlet valve 5-1 is in direct relation to the throughflow cross section of the open outlet valve 5-1. With a stipulated pressure of the fluid which flows through the outlet valve 5-1, the throughflow cross section of the valve 5-1 is, in turn, in direct relation to the instantaneous delivery flow through the outlet valve 5-1.

The relation between the distance of the end face of the setscrew 18-1 and the reference point of the distance sensor 8-1 and the delivery flow through the outlet valve 5-1 is determined by calibration. The calibration data of this calibration previously carried out are stored in the memory 10 by means of a characteristic curve. Thus, when the pump 1 is in operation, the computing unit 9 can calculate the instantaneous delivery flow through the outlet valve 5-1 on the basis of the distance, detected by the distance sensor 8-1, of the end face of the setscrew 18-1 from the reference point of the distance sensor 8-1. From the development in time of the continuously detected delivery flow, the computing unit 9 can calculate the volume delivered within a time interval.

In the same way, the computing unit 9 can calculate the delivery volume through the outlet valve 5-2 on the basis of the distance values which have been transferred by the identical distance sensor 8-2.

According to another exemplary embodiment, the sensor 8 and respectively the sensors 8-1 and 8-2 are arranged at the inlet valve 4 and inlet valves 4-1 and 4-2. As with regard to the outlet valve 5, 5-1, 5-2, they in this case measure the position and/or placement of the respective valve head of the inlet valves 4, 4-1 and 4-2. Preferably, however, the sensors 8, 8-1, 8-2 are assigned to the outlet valves 5, 5-1, 5-2. To be precise, the intake pressure which causes the inlet valves 4, 4-1, 4-2 to open is low, for example, about 0.8 bar. However, the pressure difference which leads to the opening of the outlet valves 5, 5-1, 5-2 amounts mostly to a multiple of the intake underpressure as a function of the delivery pressure of the pump 1. Measuring the valve heads of the outlet valves 5, 5-1, 5-2 therefore gives rise to a more unequivocal and consequently better change in state of the respective outlet valve 5, 5-1, 5-2. The placement of the respective valve head can also be determined more accurately in this way.

An exemplary embodiment of the method according to the invention for detecting the delivery volume and/or the delivery flow of the discontinuously operating pump is explained below:

The method is operated by the arrangement described above. A known fluid volume is located in the container 6. The value of this initial fluid volume is stored in the memory 10. The pump 1 is then put into operation. In this case, the reciprocating piston 13 is moved to and fro and fluid is alternately sucked out of the container 6 through the inlet line 2 into the first delivery chamber 14-1 and into the second delivery chamber 14-2 through the opening inlet valves 4-1 and 4-2. When the first delivery chamber 14-1 is being filled during movement of the reciprocating piston 13 from a first position into a second position, the fluid is pumped out of the second delivery chamber 14-2 into the outlet line 3. In this case, the pressure of the fluid opens the outlet valve 5-2, in that the valve head 16-2 is moved away from the valve seat 15-2 counter to the force exerted by the valve spring 17-2. The change in position of the valve head 16-2 or the exact placement of the valve head 16-2 is detected by the sensor 8-2 and transmitted to the computing unit 9, as described above.

When, after a cycle, the reciprocating piston 13 is moved in the other direction and fluid is sucked through the second inlet line 2-2 and the second inlet valve 4-2 into the second delivery chamber 14-2, the fluid located in the first delivery chamber 14-1 is pumped into the outlet line 3. The first valve head 16-2 is correspondingly moved away from the valve seat 15-1. This change in position of the first valve head 16-1 or the exact placement of the first valve head 16-1 is detected by the sensor 8-1 and transmitted to the computing unit 9. The latter, on the basis of the data, in particular calibration data, stored in the memory, calculates the volume delivered by the pump 1 and instantaneous delivery flow of the pump. These values can be indicated by the indicator device 11. Furthermore, the control device 7 can control the pump 1 on the basis of these values.

An exemplary embodiment of the extraction system 20 according to the invention and of a method for metering a plant protective, which use the arrangement described above, is explained below with reference to FIG. 3:

The extraction system 20 is divided into two components. The first component comprises a container 6 for receiving a plant protective. The container 6 has a container wall 21 and an extraction orifice 22. The container wall 21 surrounds an inner space in which the plant protective is received.

The container 6 comprises the discontinuously operating pump 1. The pump 1 is firmly connected to the container 6, i.e. the container and the pump form a unit.

For example, as shown in FIG. 3, the discontinuously operating pump 1 and the valves 4 and 5 are arranged in the inner space of the container 6. Furthermore, the pump 1 can be fastened to the outside of the container 6. The container wall 21 can form for example a cutout into which the pump 1 is inserted from the outside.

The inlet line 2 of the arrangement described above is designed in the extraction system 20 as a suction line 23 of the container 6. The outlet line 3 is led through the extraction orifice 22 of the container 6. If the pump 1 is fastened to the container 6 from the outside, the inlet line 2 is passed to the pump 1 through the extraction orifice 22 of the container 6.

The plant protective is extracted via the outlet line 3 and, for example, fed in a metered manner to a spray gun. The container 6, or the unit formed by the container 6 and the pump 1, has a first connection 24 and a second connection 25. An external unit 19 is coupled to the first component of the extraction system 20 via these two connections 24 and 25. The external unit 19 thus forms the second component.

The sensor 8 is coupled to the outlet valve 5 via the first connection 24. For example, the sensor 8, which may be designed, for example, as a distance sensor or motion sensor, is brought into a defined position of an orifice of the first connection 24 and is locked there. The sensor 8 can thus detect the position and the placement or the movement of the valve head of the outlet valve 5, as described above with reference to FIG. 2.

The pump 1 is coupled to the control unit 7 at the second connection 25. The second connection 25 may be, for example, an electrical connection, via which the control device 7 transmits control signals to the pump 1. It is also possible, furthermore, that the pump 1 is divided into a delivery unit and a drive unit. In this case, the delivery unit may be arranged inside the container 6 and the drive unit accommodated in the external unit 19. Mechanical force transmission to the delivery unit of the pump 1 can then take place via the second connection 25. Alternatively, a pneumatic or hydraulic drive may be transmitted to the delivery unit of the pump 1.

As described above, the sensor 8 and control device 7 are each connected to the computing unit 9 which, in turn, is connected to the memory 10 and the indicator device 11.

In the extraction system 20, a delivery malfunction is detected in the following way:

The test device integrated into the control device 7 checks whether the valve head 16-1 and 16-2, respectively, has changed from the first position to the second position within a defined time interval after the end of a cycle. Only in this case was fluid 1, i.e. in particular plant protective, delivered by the pump 1. If such a change in position has not been detected, there is a delivery malfunction. This delivery malfunction can have various reasons: firstly, it is possible for the container 6 not to contain any more fluid. In order to determine this, the remaining volume of the fluid in the container 6 is calculated by means of the computing unit 9.

If the remaining volume is below a defined limit value and the delivery malfunction has been determined by means of the test device, the conclusion is drawn that the container 6 is in an empty state. An indication of this empty state is then output by the indicator device 11.

Secondly, however, the delivery malfunction can also result from a malfunction of the extraction system 20, for example of the pump. If it has been detected that the remaining volume is not below the defined limit value, and yet a delivery malfunction has been detected, the conclusion is drawn that there is such a malfunction. An indication thereof can be output by means of the indicator device 11.

If an empty state of the container 6 has been detected, the pump 1 is switched off. The container 6 can now be exchanged manually for another, full container. Fluid can thereupon be delivered again, as described above.

In a further exemplary embodiment of the extraction system 20 according to the invention and of the method for metering a plant protective, the extraction system 20 comprises not just one container 6 but a plurality of containers 6, for example two of the above-described containers 6. Each container comprises a pump 1. The outlet lines 3 of the containers 6 are in this case united.

The external unit 19 is now initially coupled to the first container 6. The fluid, i.e. the plant protective, located in the first container is then extracted.

If an empty state of the container 6 has been detected, the pump 1 is automatically switched off and the external unit 19 is automatically coupled to another, full container 6. To this end, the extraction system 20 has a changing device, by means of which the coupling of the sensor 8 with the first connection 24 and the coupling of the control device 7 or of the drive unit with the second connection 25 are released from the first container and coupled with corresponding connections 24 and 25 of the other container 6. Alternatively, the sensor 8 and the control device 7 or the drive unit are already coupled with the respective connections 24 and 25 of all the containers 6 of the extraction system. If an empty state of the first container 6 is then detected, only a switchover to the next container 6 takes place. Fluid is thereupon delivered again, as described above. The change between the containers 6 takes place in this case substantially without a delay.

LIST OF REFERENCE SYMBOLS

1 Pump, piston pump, reciprocating piston pump
2 Inlet line
2-1 First inlet line
2-2 Second inlet line
3 Outlet line
4 Inlet valve
4-1 First inlet valve
4-2 Second inlet valve
5 Outlet valve
5-1 First outlet valve
5-2 Second outlet valve
6 Container
7 Control device
8 Sensor
8-1 First sensor, first distance sensor, first motion sensor
8-2 Second sensor, second distance sensor, second motion sensor
9 Computing unit
10 Memory
11 Indicator device
12 Housing
13 Reciprocating piston
14-1 First delivery chamber
14-2 Second delivery chamber
15-1, 15-2 Valve seat
16-1, 16-2 Valve head
17-1, 17-2 Valve spring
18-1, 18-2 Setscrew
19 External unit
20 Extraction system
21 Container wall
22 Extraction orifice
23 Suction line
24 First connection
25 Second connection

The invention claimed is:

1. An arrangement for detecting a delivery volume and/or a delivery flow, with
 a discontinuously operating pump,
 at least one outlet line and one inlet line and
 a passive valve, which is arranged in the outlet line or the inlet line and which has a valve seat and a valve head, the valve being closed in a first position of the valve head and the valve being open in a second position of the valve head
 a sensor, by means of which values can be detected which indicate whether the valve head is in the first or the second position, and
 a computing unit, which is coupled to the sensor and by means of which the volume delivered by the pump and/or the delivery flow of the pump can be calculated on the basis of the detected values of the sensor,
 the pump operating cyclically, a defined fluid volume being delivered by the pump during each cycle, the valve head being in the first position between two cycles and it being possible for it to be detected by means of the computing unit and the sensor how frequently the valve head changes from the first position to the second, and it being possible for the volume delivered by the pump to be calculated on the basis of the number of changes from the first position to the second, and having
 a test device for detecting a delivery malfunction, which is coupled to the pump and sensor and by way of which it is possible to test whether the valve head has changed from the first position to the second position within a defined time interval after the end of the cycle
 wherein
 the computing unit comprises a memory in which an initial volume in a container connected to the inlet line is stored, and
 wherein the computing unit is set up to calculate a remaining volume in the container and to test whether the delivery malfunction is a malfunction of the pump or an empty state of the container.

2. The arrangement according to claim 1, wherein,
 the position of the valve head in relation to the valve seat in the second position of the valve head can be detected by means of the sensor.

3. The arrangement according to claim 2, wherein,
 the sensor is a distance sensor, by means of which the distance of the valve head from a reference point can be detected.

4. The arrangement according to claim 1,
wherein
the sensor is a motion sensor by way of which a movement of the valve head is detectable.

5. The arrangement according to claim 2,
wherein,
the computing unit is coupled to the memory or a further memory which stores calibration data which indicate the delivery flow through the valve as a function of the position of the valve head in relation to the valve seat, and wherein the volume delivered by the pump and/or the delivery flow of the pump can be calculated by the computing unit on the basis of the position, continuously detected by the sensor, of the valve head and on the basis of the calibration data.

6. The arrangement according to claim 1,
wherein,
by means of the computing unit, an indication of an empty state can be indicated by an indicator device when the remaining volume is below a defined limit value.

7. An extraction system for a plant protective, with
a container, which has a container wall and an extraction orifice, the container wall surrounding an inner space for receiving the plant protective, and
an arrangement according to claim 1,
the discontinuously operating pump being coupled to the container such that plant protective located in the container is delivered by means of the inlet line of the pump through the pump to the outlet line of the pump
the sensor and the computing unit being arranged in an external unit, and
the container having a first connection for coupling the sensor to the valve of the pump for the purpose of detecting the position of the valve head.

8. The extraction system according to claim 7,
wherein,
the discontinuously operating pump being arranged in the inner space of the container such that plant protective located in the container is delivered by means of the inlet line of the pump through the pump via the outlet line of the pump to the extraction orifice of the container.

9. The extraction system according to claim 7,
wherein
the discontinuously operating pump is fastened to the outside of the container.

10. The extraction system according to claim 7,
wherein
the extraction system comprises a plurality of containers and a changing device, the containers each comprising a pump and it being possible, by means of the changing device, for the coupling of the sensor with the first connection to be automatically released from the first container and to be coupled with the first connection of a further container.

11. A method for metering a plant protective, in which the plant protective is delivered by means of a discontinuously and cyclically operating pump and the delivery volume and/or the delivery flow of the pump is detected, in which
a pump element is driven, with the result that the plant protective is delivered out of a container, the delivered plant protective opening a passive valve, arranged in an outlet line and/or an inlet line, counter to an opening force of the valve, in that a valve head is moved in relation to a valve seat from a first position into a second position,
a defined plant protective volume is delivered by the pump during each cycle, wherein the valve head is in the first position, in which the valve is closed, between two cycles, it being detected how frequently the valve head changes from the first position to the second position, and the volume delivered by the pump being calculated on the basis of the number of changes from the first position to the second,
wherein
it is tested whether the valve head has changed from the first position to the second position within a defined time interval after the end of a cycle, and a delivery malfunction is detected if the valve head has not changed from the first position to the second position within the time interval after the end of a cycle
wherein the initial volume of the plant protective in a container is detected, and
wherein the remaining volume of the plant protective in the container is calculated and it is tested whether the delivery malfunction is a malfunction of the pump or an empty state of the container.

12. The method according to claim 11,
wherein,
in the second position of the valve head the position of the valve head in relation to the valve seat is detected.

13. The method according to claim 12,
wherein,
the volume delivered by the pump and/or the delivery flow of the pump are/is calculated on the basis of calibration data, which indicate the delivery flow through the valve as a function of the position of the valve head in relation to the valve seat, and on the basis of the continuously detected position of the valve head.

14. The method according to claim 11,
wherein
an indication of an empty state of the container is output when the remaining volume is below a defined limit value and a delivery malfunction has been detected.

15. The method according to claim 11,
wherein
an indication of a malfunction is output when the remaining volume is not below the defined limit value and a delivery malfunction has been detected.

* * * * *